March 29, 1960 G. ALIG ET AL 2,930,439
BUOYANT TRACTION VEHICLE
Filed June 1, 1956 5 Sheets-Sheet 1

Fig.1

INVENTORS:
Georges Alig
Roman J. Filipkowski

March 29, 1960

G. ALIG ET AL 2,930,439

BUOYANT TRACTION VEHICLE

Filed June 1, 1956

INVENTORS
Georges Alig
Roman J. Filipkowski

March 29, 1960  G. ALIG ET AL  2,930,439
BUOYANT TRACTION VEHICLE
Filed June 1, 1956  5 Sheets-Sheet 4

INVENTORS:
Georges Alig
Roman J. Filipkowski

March 29, 1960

G. ALIG ET AL 2,930,439

BUOYANT TRACTION VEHICLE

Filed June 1, 1956

INVENTORS
GEORGES ALIG
ROMAN J. FILIPKOWSKI
by R.J. Filipkowski
AGENT

United States Patent Office 2,930,439
Patented Mar. 29, 1960

2,930,439

BUOYANT TRACTION VEHICLE

Georges Alig, Moonbeam, Ontario, and Roman J. Filipkowski, Ottawa, Ontario, Canada, assignors, by direct and mesne assignments, to Alig Terra-Marina Equipment Ltd., Ottawa, Ontario, Canada, a body corporate of Ontario Application June 1, 1956, Serial No. 588,666

9 Claims. (Cl. 180—49)

This invention relates to traction vehicles and in particular is directed to improvements in self-powered wheeled vehicles capable of traversing soft or yielding ground including muskeg, streams, rivers or lakes, and snow or ice, and which are effective to develop useful tractive force while on such media.

Embodiments of the invention described hereinafter are characterized by an articulated sectionalized vehicle form having three principal sections, which together comprise a wheeled vehicle having cylindric wheels of considerable lateral extent. Such vehicle includes provision for steering with equal facility whether on land, ice, or water. It is moreover adaptable to handling upon steep inclines and to traversing uneven terrain, and has the capacity for developing positive tractive force even if the greater part of the wheel surfaces are in contact with relatively incoherent materials such as ice, mud, or water.

In the specific embodiment of the invention hereinafter particularly described applicants have realized a vehicle wherein separate front and rear trucks each comprises a plurality of axially aligned, hollow sealed drumlike wheel bodies supported on transverse spaced apart axles, and the trucks are articulated with respect to an intermediate motor-supporting buoyant gondola section, the latter being arranged for pivotal movement about respective vertical and longitudinal axes passing through respective truck axle centers. Each drum is independently drivable by individual coupling means on its supporting axle, and may be driven either in forward or reverse rotational sense, with freedom to over-run the drive. The drums are in sectional half-drum form and may be readily separated and removed from the axle.

It is accordingly on object of the invention to provide a tractive type vehicle having extended cylindric wheeled front and rear trucks articulated with respect to an intermediate gondola body for pivotal movement about respective spaced apart bearings whose axes are disposed at right angles to each other and pass through individual truck axles.

It is another object to provide, in a buoyant traction vehicle, detachable sectional drum-like wheels axially aligned on respective truck axles wherein each wheel is separable as two halves assembled about a collar.

Yet another object is the provision in a buoyant traction vehicle of a steerable truck adapted to rotate about a vertical axis passing through an intermediate body and through the mid-length of the truck axle, including coupling means adapted to transmit large longitudinal forces therebetween and to withstand large bending stresses.

A further object is the provision of powered drive from a motor-supporting intermediate body to a steerable truck, which latter has the form of an elongate cylinder made up of axially aligned drum-like wheels carried on an axle, by means of a transmission and coupling effective to transmit driving power at any position of the steerable truck with respect to the intermediate body.

Yet another object is the provision of powered drive from an intermediate body to relatively articulateable longitudinally spaced front and rear trucks jointly, wherein a front truck is pivotally attached to the intermediate body for rotation about a vertical axis passing through the forward end of the intermediate body and the rear truck is pivotally attached to and rotatably supported with respect to the intermediate body for relative rotation about a longitudinal axis extending through the rear of the body.

It is a further object of this invention to arrange for the relative rotation about a horizontal longitudinal axis of a rear truck with respect to an intermediate vehicle body, wherein a drive axle for powering the rear truck is mounted coaxially with the longitudinal axis.

It is another object of the invention to provide a strong and efficaceous rotatable coupling means between a front truck of a buoyant traction vehicle and an intermediate gondola body, wherein the coupling is adapted to withstand large lateral and vertical forces and to withstand large longitudinal forces.

Still another object of the invention is the provision of sealing means and rotatable joint means for a horizontal coupling between a traction vehicle truck and an intermediate body from which drive is transmitted coaxially of the coupling to power the truck.

A further object is the provision of sealing means for excluding water and dirt from drive mechanism for a coupling rotatably supported on an axle.

Yet another object is to provide adequate braking means effective to prevent rotation of the truck axles and realized as a single divided brake for each truck.

It is also an object to provide a rigidly braced and strong yet relatively light front truck having a comparatively high degree of positive buoyancy.

The foregoing and many other objects and features of the invention will be made apparent from a reading of the following specification describing preferred embodiments of the invention together with a study of the figures of accompanying drawing, wherein:

Fig. 3 is an elevation looking forwardly on a section taken as indicated by line 3—3 of the front truck of Fig. 1, and showing part of the truck framing and the arrangement of wheels;

Figure 1:
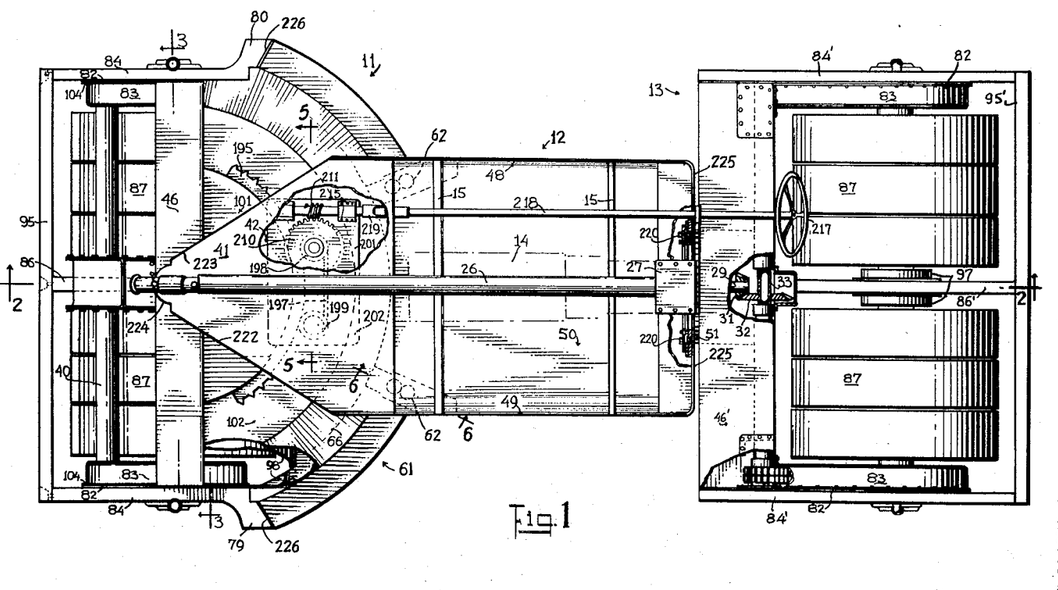
Fig. 1 is a plan view of a traction vehicle embodying the invention.
Figure 2:
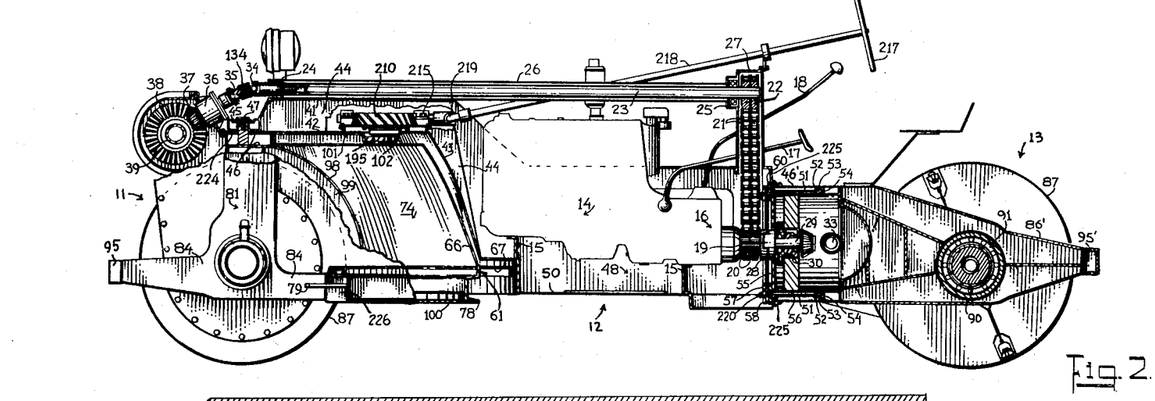
Fig. 2 is a side elevation of the vehicle taken on line 2—2 of Fig. 1.

Referring now to the drawings, a traction vehicle according to the invention is shown in Figs. 1 and 2 and comprises a forward truck generally designated 11, a middle section 12, and a rear truck 13. A source of power such as an internal combustion engine 14 indicated in outline only is supported on a bed comprising flanged sections 15 extending across and rigidly secured to the middle section bottom 50 and side walls 48 and 49. The engine is set with its crankshaft aligned longitudinally of the vehicle and medianly of the width of the section. A transmission 16 which may be of any suitable type such as a conventional change-gear unit is provided with operating controls including clutch pedal 17 and a speed-change lever 18. As will be well understood from conventional systems, the engine imparts torque via the transmission and clutch to the shaft 19, which torque is transferred by means of coupling 28 to a short shaft 29 journalled in bearings 30 held in the frame.

The torque applied to shaft 19 is manifested at gears 20 fixed thereto. The latter engage vertically extending transmission chains 21, which drive an upper set of gears 22 corresponding to the lower gears 20. Gears 22 are fixed to the end of a torque tube 23 which is journalled for rotation in bearings 24 and 25 and is totally enclosed by a housing 26. The gears 22 and the upper portions of the transmission chains 21 are protected by a housing 27 to which the housing 26 is detachably secured, as by bolts.

At the forward end of torque tube 23 a double universal joint including a telescopically splined joining section 134 between elements 34, 35 is arranged to transfer torque at uniform angular velocity to drive a shaft (not shown) which is journalled in bearings housed within the enclosure 36, upon whose other end pinion 37 is fixed. Bevel gear 38 is thereby driven, and it is arranged that the direction of drive is in the same sense and at the same rotational speed as is bevel gear 32 which drives the rear traction elements. A transverse shaft 39 is enclosed within a housing 40 which is constructed to extend across the width of the front truck somewhat above the axle 88 and forwardly thereof. In a similar way, transverse shaft 33 journalled in bearings in the rear truck frame is effective to impart torque to the rear driving wheels 87, as will be described hereinafter, as torque is developed by pinion 31 engaging bevel gear 32.

The intermediate section 12 has a tank-like form, and may be compared with a gondola in that the forward part has an upper deck generally designated 41 lying somewhat above the hull-like main body of the section. The upper deck decreases in breadth forwardly, as does the sub-deck 42 which is spaced uniformly below the upper deck. Vertical walls 222 and 223 close in the sides of the extending neck 224. A forward wall 43 of the tank is formed as a surface of revolution about a vertical axis coinciding with the pivot axis of the front truck. A vertically disposed septum or bracing wall 44 is rigidly joined between the opposed faces of decks 41 and 42 and extends downwardly into the tank against the forward wall 43 to which it is secured as by welding.

At the forward end of the gondola a short thick cylindric shaft 45 disposed vertically is received within a bore formed in an extension of the sub-deck 42 and a forwardly extended portion of deck 41. The assembly forms the bearing about whose axis truck 11 rotates relatively to the gondola. A bolt 47 threadedly engaging the axle 45 is provided with a washer beneath the bolt head to prevent relative upward displacement of the neck of the gondola. Axle 45 extends upwardly from and is secured to the transverse frame 46 crossing over the wheels and parallel to the wheeled axle 88, the latter being shown more particularly in Fig. 3. This part of the frame is strongly constructed to withstand the large forces applied to the bearing.

Figure 8:
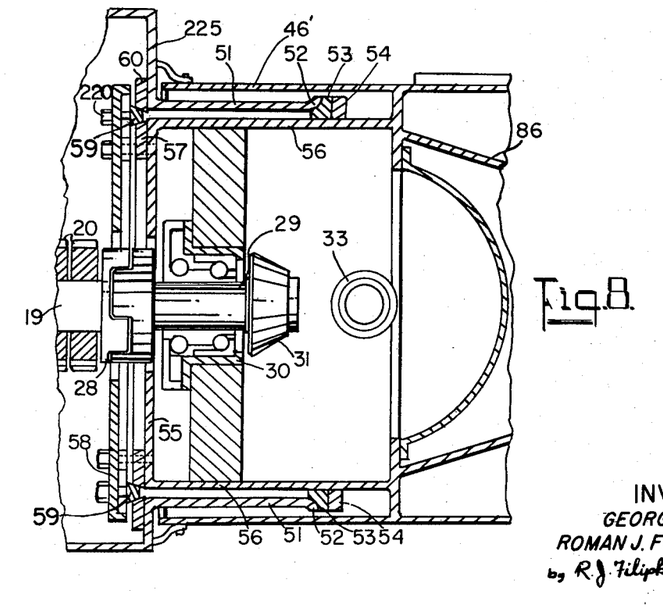

At the rear of the gondola a vertical wall 225 closes the end, to define, together with forward wall 43, side walls 48, 49, and bottom 50, a tank-like body open at the top and having considerable displacement. It will be apparent that such structure has lateral stability and even when immersed partly provides positive buoyancy for the section. A tubular extension 51 whose axis is longitudinally aligned with the length of the vehicle and which is coaxial with the shaft 29, extends rearwardly of wall 225. An outwardly flaring flange 52 formed on the end of the tube 51 bears against a complementarily formed ring 53 secured to annular disc 54. The latter is affixed to and girdles a cylindric tubular body 56 coaxial about the shaft 29 and extending forwardly from the rear truck transverse frame 46', terminating in an end wall 55. A fitting 57 is secured to the forward end of the wall 55 coaxially of the tube and has a conic face against which ring 59 is pressed by a peripherally spaced group of bolts 220 threaded through disc 58 forming part of the fitting. A disc 60 in the same plane as fitting 57 having a complementarily formed conic face is supported on the inner side of vertical rear wall 225 of the gondola and provides a bearing seat for ring 59. When assembled, ring 59 is under pressure distributed over its face by the bolts 220 to firmly seat it against the cone-faced discs 57 and 60 for the purpose of preventing play and to act as a seal for lubricant. Since the joint formed by coaxial cylinders 56 and 51 will in the course of ordinary service be in constant rotary movement about an average rest position, and will transmit large longitudinal forces as well as being under considerable bending stress, adequate lubrication of the bearing is essential. For this reason ring 59 may advantageously be of a porous sintered metal having its pores loaded with an oily lubricant. The spaces around the ring 59, and the spaces between tubular bodies 56 and 51, are preferably loaded with a viscous lubricant such as a soft grease and may include a metal soap lubricant selected from materials such as are commonly used in bearings where water is likely to be present.

It will be observed in the relationship of the parts forming the longitudinal pivot bearing that there is a dual seal and a pair of spaced apart bearings supporting the tubular body 56 for relative rotation within tubular extension 51. By providing these parts in relatively large diameter and by designing the structure with due regard to the purposes of the vehicle, a strong joint may be realized which is capable of transferring large forces both longitudinally and laterally.

From the preceding description it will now be apparent that there is provided a central or mid-section adapted to support an engine and transmission, together with fuel tanks and ancillary equipment, which is swivelled about a longitudinal axis coaxial with a power drive shaft 29 relatively to the rear truck 13, and which is pivotally arranged for rotation about a separate vertical axis with respect to the forward truck 14. By the design of the concentric cylindric coupling for the rear truck there is provided articulation with one degree of freedom of the rear truck relatively to the gondola, which remains equally effective for any angle of swivelling within a practical range of angles, without impairing the transmission of power to the rear truck transverse shaft 33. Similarly the forward truck has one degree of freedom relatively to the gondola over a range of angles right and left with effective transfer of power to the front truck throughout the range.

Figure 6:
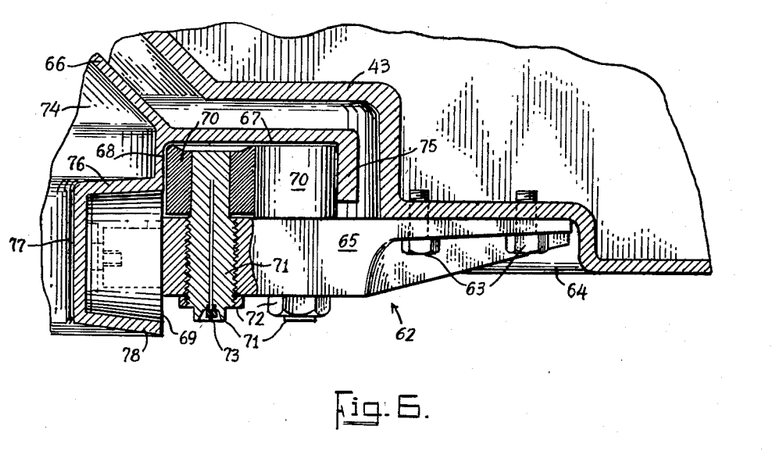
Fig. 6 is a partial section taken on line 6—6 of Fig. 1, illustrating the structure of the front truck guide arc and of the guide rollers in working relation therewith.

Inasmuch as the majority of applications of such vehicle are likely to involve pushing an accessory device such as a shovel, blade or drag, the design of the vehicle requires the provision of strong coupling means between the forward end of the gondola and the front truck which will be capable of withstanding and transferring large forces from any direction, and for all positions of the front truck within angles right and left of about 35 degrees with respect to a longitudinal direction. For this reason the embodiment herein described includes, between the lower front margin of the gondola wall 43 and the lower rear extremity of the front truck, wall 66, a pair of gondola-mounted guide roller assemblies 62 engaging a massive guide arc generally designated 61 integral with the forward truck, having a radius somewhat greater than half the width of the front truck. Referring additionally to Fig. 6, a pair of guide roller assemblies 62 is seated on each side of the gondola, having their vertical longitudinal axial planes intersecting the vertical pivot axis of the front truck, and disposed in horizontally extending recesses 64 formed in the forward wall 43 near the lower margins thereof. A number of bolts 63 secure the assembly against the underside of a flat face or shelf formed by the recess, the bolts passing through a shank part extending from a roller mounting part generally designated 65. The guide arc structure 61 is integrally joined to the lower rear margin of a curved wall 66 which is an enclosing member for a hollow space within the front truck frame generally designated 74. The arc is formed as a pair of curving channels, including a flanged channel 67 having downwardly extending forward and rear flanges 68 and 75, and a horizontally arcuate channel 77 having upper and lower flanges 76 and 78 disposed as segments of conic shells. Flange 68 is joined to flange 76, as by welding.

A pair of rollers 70 are supported on axles 71, which are threadedly engaged in bores formed in the body 65. The axles are locked in place by retaining nuts 72 at their lower ends. Lubricant may be injected as by a pressure device by way of nipple 73. Both rollers are normally freely fitted on their axles, whereby longitudinal movement of body 65 is effective to transfer pressure from one roller against the other as either of flanges 68 or 75 bear against one of them. A single roller 69 is journalled on an axle (not shown) which is integral with the body 65 and whose axis is at right angles to the axes of rollers 70. Roller 69 is conic and is disposed with the apex of the generating cone on the front truck vertical pivot axis. The larger diameter of the roller is arranged to be slightly less than the largest vertical dimension between upper and lower flanges 76, 78, whereby the roller has a slight play in the vertical direction when the gondola is being pushed forward relatively to the front truck.

Relative rotation of the front truck about the vertical pivot axis may therefore be shown to be controlled jointly by the pinning of the forward end of the gondola upon the vertical axle 45, and by the co-operation of the assembly of rollers with the guide arc. Forward-reverse movements of the gondola relatively to the front truck are restrained to a negligible play by virtue of the flanges 68 and 75 which bound the rollers 70. Vertical movement of the front truck guide arc relatively to the gondola is restricted also to a slight play by the roller 69 between flanges 76 and 78. Since the two guide roller assemblies are spaced apart on opposite sides of the gondola, there is provided a three point attachment for the front truck, which remains equally effective as the truck is rotated left or right of center through angles of about 35 degrees. In this regard it will be apparent that the extreme position of the truck to either side of center is determined by the position of the end of the guide arc.

At the ends of the guide arc, a pair of plates 79 and 80 are secured, by welding, to vertically disposed closures 226 for the channels, and are also attached to horizontal rearward extensions of the side frames 81 of the truck. To these plates 79 and 80 there may be attached fittings of any suitable type for receiving thrust arms (not shown) for mounting earth moving devices ahead of the front truck. The flanges 76 and 78, and the channel web 77 are smoothly and integrally joined with the aforesaid side frame on each side. A hermetic closure is provided at each end of the guide arc, so as to provide a buoyancy contribution by the frame.

Figure 7:
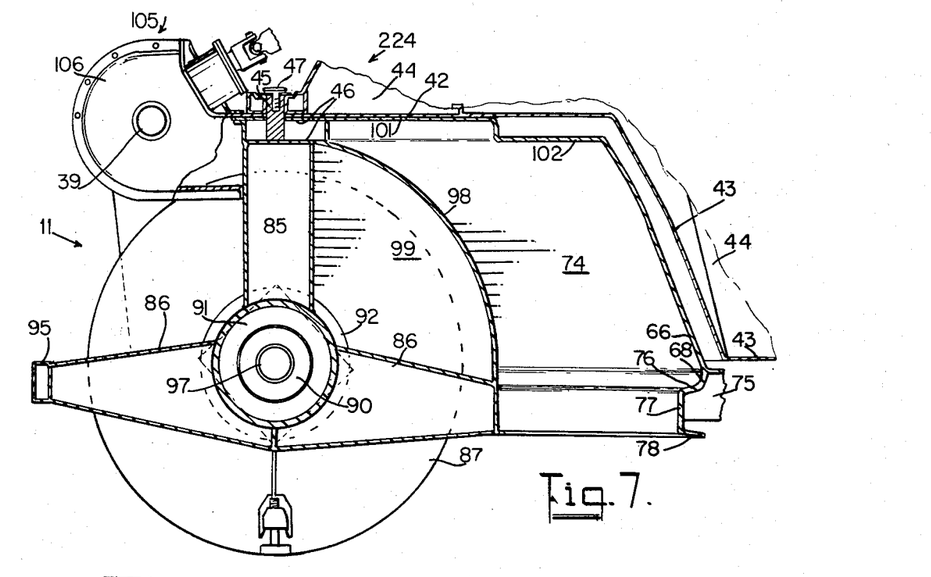
Fig. 7 is a longitudinal vertical section of the front truck of Fig. 1, and, Fig. 8 is an enlarged cross section elevation of the coupling of the rear truck as in Fig. 2.

The framing of the front truck may be studied by reference to Fig. 3 additionally and to Fig. 7, wherein a partial vertical cross-section is shown.

The front truck frame is realized as an upper transverse hollow member 46 integrally joined with vertical side frames 81 and central vertical strut 85. A longitudinal central brace 86 extends between the lower end of strut 85 and the center of horizontal front bar 95, being integrally joined with the former and detachably attached to the latter as by bolts. The front bar is similarly detachably joined at its ends to the forward extremities of side horizontal braces 84, which are integrally formed in the region of the outer ends of axles 88 with vertical members 81. Side braces 84 extend rearwardly to meet with the ends of channel 77 and associated flanges 76, 78, to which they are integrally secured as by welding, provision being made to hermetically seal the hollow frame so constructed. At the junction of vertical strut 85 and longitudinal brace 86 there is provided a cylindric aperture in which radial ball bearing 91 is fitted and retained as by side plates 96. The latter are removable and secured by peripherally spaced bolts, and include suitable packing and sealing gaskets to prevent access of water. Supported on the outside of each plate 96 is a braking element 92 and hydraulic actuator (not shown) which may be of conventional form. Center axle block 90 rides in the bearing 91 and is closely fitted within a pair of pan-like bodies 97 having cylindric inner surfaces, disc-like sides, and cylindric re-entrant flanges enclosing the brakes. The inner faces of the flanges serve as brake shoes against which brake elements 92 may be pressed to prevent relative rotation of block 90 with respect to the frame. The brake structure is preferably constructed of materials which are not affected by flooding, and the flanges of bodies 97 are not necessarily sealed with respect to plates 96.

The inner ends of a pair of tubular main axles 88 are detachably received upon and secured to the block 90 by coupling means. The outer end of each main axle 88 is similarly detachably joined to end bearing support block 93 which is journalled in spherical roller bearing 94 housed in an aperture provided at the junction of side braces 84 and vertical side frames 81. Also affixed to block 93 by suitable key means (not shown) are the multiple gears 103. As the gears 103 are rotated, both axles 88 are therefore jointly driven.

Longitudinal brace 86 continues rearwardly from the front truck bearing 91 to join a cylindric shielding wall 98 coaxial with the axles 88. A buoyant volume 74 is enclosed within a structure bounded by the cylindric wall 98, by surface of revolution 66, also by a horizontal bottom plate 100, and by upper horizontal plates 101 and 102 which are integral but relatively stepped. By this construction which is also shown in Fig. 7 it will be apparent that there is provided an important volume which is totally enclosed and whose displacement would contribute useful buoyant force. Moreover there is realized a very strong and rigid framework connecting the guide arc 61 to the longitudinal braces 84 and 86 as well as to upper frame 46. A vertical plate 99 is further provided which is disposed in a longitudinal plane and effectively joins vertical strut 85 with wall 98 and is connected along its lower margin with brace 86, whereby the front truck is rendered highly resistive to twisting and is enabled to withstand large forces in the course of service, yet may be constructed of relatively thinner sections than prior art frames.

Inboard of each of the vertical side frames 81 there is provided a relatively extensive plate 82, which is disposed in a vertical plane and which is rigidly and permanently attached to the frame, preferably by welding. Secured to the margins of these plates are respective left and right unitary gear housings 83 having plane faces 236 parallel with and spaced from plates 82 by integral side walls 227 at right angles thereto, resembling shallow pans, the side walls having a continuous flange 104 in a vertical plane. A plurality of bolts secure the housing by its flange to the respective plate 82, adequate sealing devices being employed to exclude water. Circular apertures 228, 229 are provided in both the plates 82 and the gear housings 83 concentric with the axes of gears 103, the aperture in the housing closely fitting over the end of stub axle 88' received therein. Suitable sealing means 89 are provided to prevent ingress of water at the joint while lubricant loaded packing or other lubricating means may be employed as seal between the main axle 88 and stub axle 88'. The tubular housing 40 terminates upon apertured faces 236 at the upper margin of opposed housings 83, to which the ends of 40 may be secured, as by threaded joints or other suitable fastening and sealing means.

The inner ends of housings 40 are bolted or clamped to the side plates 106 which form closing walls of a gear box 105 for the front truck drive gears 37, 38. Rearward extensions of the housing walls 106 are detachably secured to the transverse frame 46 and to the vertical strut 85, whereby to provide a rigid support for the transverse drive shaft 39.

The outer ends of shaft 39 are received in bearings supported on the inside of plate 82, and support drive pinions (not shown) of conventional form which drive a plurality of chains 230. It should be noted that the type of bearing used should allow axial play of shafts 39, whereby the drive mechanism located within the box 105 is not axially stressed due to forces carried by the front truck frame. Drive gears suitable for the purpose may be similar to those designated 20 and 22 in Fig. 2.

It will now be evident that as the torque tube 23 is driven from the engine, the gears 103 on each side of the front truck will be rotated together in the same direction and that the axles 88, 88′ and ancillary apparatus will rotate therewith. It may now be noted that in keeping with the purposes for which the vehicle is devised, wheels 87 are arranged in the form of drums, which are axially aligned along main axles 88 with close spacing. Each drum is independent of its neighbor and has free-overrunning character but is prevented from rotating in a direction opposite to that in which its axle is being driven.

Figure 4:
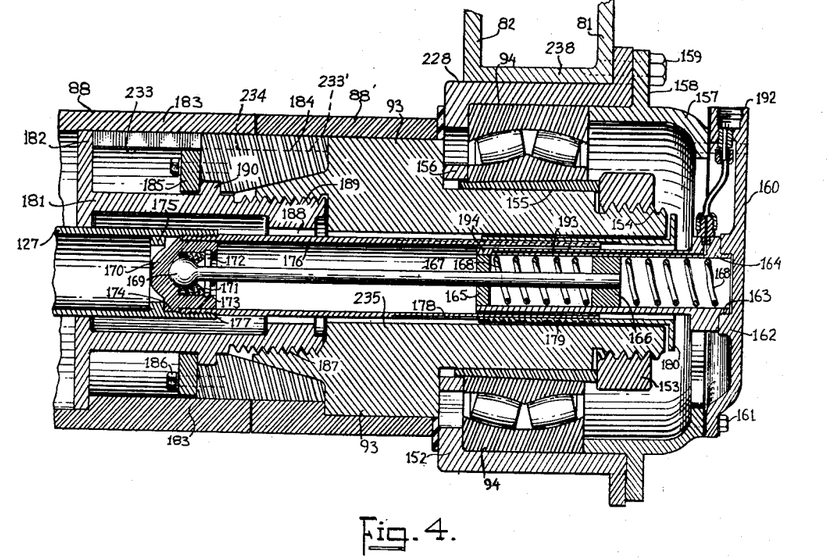
Fig. 4 is an enlarged view of part of the front truck showing an end bearing and a hydraulically actuatable mechanism for displacing the shift clutches of all wheels simultaneously in an axle.

The specific arrangements for assembly of an axle section may be understood by referring to Fig. 4. The diagram shows the right-hand end bearing of the truck of Fig. 3 in section, including hydraulically or pneumatically actuated shift mechanism. The removable axle section 88 terminates in a cylindric shell having an inwardly thickened wall 183 in whose inner face there is formed a series of splined grooves 233. Stub axle 88′ affixed upon bearing support block 93 is identically constructed with matching internal spline grooves 233′. When the axle is assembled the splines 233 and 233′ are in axial registry and are engaged by a massive ring 184 having mating spline grooves 234 in its outer cylindric face, whereby the ring 184 is effective to prevent relative rotation between axle 88 and stub axle 88′. In addition the ring 184 is effective to hold the axle sections coaxial. Bearing support block 93 is formed with a cone shaped boss 187 upon which a correspondingly shaped inner face of ring 184 is seated. The block has a cylindric bore coaxial therewith and in the region of the boss 187 the bore is of larger diameter, in which an internal thread 189 is formed. An external thread on the end of fitting 181 carried by axle 88 is received within the threaded bore, the action serving to draw up ring 184 which is captive upon the fitting and rotatable relatively thereto. The fitting 181 carries a shoulder 190 on its outer face about midway between its ends, which engages a groove formed between a shoulder adjacent one end of ring 184 and a splined disc 185 bolted to the end of ring 184 by a number of bolts 186. As fitting 181 is rotated, as by means of a tool engaging the internal spline 188, the threaded end engages the bore 189, so that depending on the sense of rotation ring 184 is either drawn out of or is brought into engagement with body 93. As fitting 181 is turned in such sense and to such degree as to disengage the threaded parts entirely, ring 184 becomes entirely retracted within the end of axle 88. Moreover, since fitting 181 has a flanged centrally apertured closing disc 182 integrally formed with it, the assembly of the fitting, ring 184, and end disc 185 may be pushed back a short distance further when it is desired to remove the axle section. In a similar manner the inner end of the axle section may be disengaged from the center block 90, by means of a similar fitting having an axial rod 191 integral therewith and extending towards the outer end of the truck. Rod 191 may be operated as by a suitable tool inserted within tube 127 from the outer end of the truck. The manner in which this may be accomplished will appear more directly following the description of the shift mechanism.

The outer end of block 93 is formed with a stepped diameter portion including an end portion of reduced diameter with an external thread 154, upon which a large nut 153 is threadedly engaged. A ring of tapered section 155 is employed in conjunction with and coaxially of a spherical roller bearing 94. The latter is supported upon the first stepped diameter portion of the body 93 and spaced from the shoulder by ring 156 which retains the inner race. It will be seen that as nut 153 is turned on, the bearing 94 is locked in place against axial displacement. The manner of supporting such bearing is well known in the art and is described here merely to assist in the general description.

Outer race of bearing 94 is retained between a flanged casing 152 and an inwardly directed flange of end shell 157. Casing 152 is received within a cylindric shell 238 connecting vertical side frame 81 with plate 82 of the front truck. Both the end shell and the casing 152 are secured together and to the member 81 by a series of bolts 159 threaded into member 81 and uniformly spaced around the margin of the flange 158 of the shell. It will be apparent that axle 88 is thereby revolubly supported in the vertical side frame of the truck, with a limited degree of freedom to gyrate in its support, as is inherent in the operation of spherical roller bearings.

Secured to the outer end of shell 157 is a closure 160 having a flange margin through which pass a number of cap screws 161, threaded into holes formed in an inwardly turned flange of the shell. Suitable gasket sealing means are preferably interposed between the closure and the shell to prevent water from entering and lubricant, etc. from escaping. A boss 162 centrally positioned extends inwardly axially of the closure and has a threaded bore 163 to receive the end 164 of a hydraulic or pneumatic actuator. The latter is preferably additionally secured as by pins or set screws (not shown) to prevent its loosening in the handling of the closure. The actuator comprises a cylinder 194 having an end wall 165, a piston 166 and a piston rod 167. A pair of compression springs 168 on either side of the piston serve to urge the piston into a rest position medianly of the length of the cylinder. Hydraulic or pneumatic fluid is admitted to an end of the cylinder as by tube 193 formed in the wall and connecting with the left-hand space, suitable conduit means being provided between the cylinder wall and the fitting 192 formed in the closure 160. It is of course to be understood that a similar but separate path is provided to admit fluid to the right-hand space of the cylinder whereby bi-directional powered movement of the piston may be effected. Suitable connections are provided between such fittings including that designated 192 and control valves elsewhere located controlling the admission of fluid as desired. The end 169 of piston rod 167 is ball-shaped and is retained within fitting 170 having an axial bore facing the cylinder and a spherical seat for the ball. A ring 171 of a material such as plastic or a lubricated sintered metal serves to hold the ball captive, and is itself retained in the bore by spring ring 172 in groove 173. A shoulder 174 on the fitting is engaged between an inwardly protruding flange 175 near the end of tube 127 and the end of a tube 176 threaded inside of the end of tube 127. Accordingly the latter tube is caused to move as one with the piston 166. It will be observed that the outer face of tube 176 adjacent the cylinder is splined as designated 178 and the tube is received within a correspondingly splined tube 179. The end of tube 179 near the closure has a disc flange of such diameter as to prevent the tube from moving inwardly beyond the end of body 93 or from moving outwardly beyond the enlarged seat of the cylinder.

The assembly described in the foregoing is adapted to be readily taken down for purposes of maintenance and for the purpose of removing an axle section. To accomplish the latter, such hydraulic or pneumatic fittings as attach to fittings 192 in the closure 160 are first disconnected and the open ends suitably closed to prevent access of dirt or obstructions. Closure 160 is then removed from shell 157 by removing the bolts 161 and cylinder 194 is withdrawn, bringing tube 127 to the right to the limit of its movement. It may in some instances be advantageous before disconnecting the power shift means to displace tube 127 by means of piston 166 before removing closure 160. Flange 180 is then engaged by a suitable tool, being brought out from its normal position adjacent the end of body 93 if desired, and is rotated counterclockwise as necessary to separate the threads 177. Once tube 176 is freed from tube 127, the actuator mechanism assembly may be removed. Thereupon, as has been previously described, fitting 181 is engaged by a tool inserted within the bore in body 93 to engage shoulders 188. Presuming the sense of the thread is right-hand, the tool and the fitting are turned clockwise to release the ring 184. Similarly rod 191 which is attached to a corresponding fitting associated with block 90 at the truck center bearing is suitably rotated to release a corresponding splined ring. When the axle 88 is free at both ends, it may be bodily removed out. For this purpose the front transverse frame member 95 is made removable by disconnecting bolt attaching means (not shown) holding it to the longitudinal frame members.

In the foregoing description which has been directed to a bearing and associated mechanism for one side of the front truck, it is to be understood that the disclosure is general and relates equally to the other side of the truck, and moreover the description is applicable to either side of the rear truck.

Re-assembly of axle sections is carried out as a generally reversed sequence of steps.

Provision for steering of the front truck may take a number of forms as exemplified in prior art designs of heavy machinery such as road rollers employing pivoting trucks. In the embodiment of the present invention a preferred form of steering particularly shown in Figs. 2 and 5 includes an elevated horizontally disposed arc 195 bearing a number of teeth 196 spaced along the edge, strongly secured to the shelf or step 102 formed in the upper face of the front truck buoyant structure described earlier. The arc is positioned concentrically with the pivot axis through shaft 45, and is spaced to lie midway between the upper surface of the flat area designated 101 and the lower surface of step 102. Each of the teeth 196 is of a form adapted to work with a conventional roller transmission chain of size and strength adequate to withstand the loads imposed by the front truck. The spacing between two adjacent teeth is moreover arranged to be two pitch distances of the roller chain which is comprised of rollers 197 and side links 198. The chain is engaged with a limited arc length of the steering arc as may be seen in Figure 1. The chain is supported between and in torque transfer relation with a pair of gears 199, 200 journalled in bearings supported from auxiliary decks 201, 202, spaced above and secured by bolts 212 to lie parallel with the plate 42 which forms the floor of the gondola extension. Gear 199 is supported on and keyed to a vertical short shaft 203 which has three cylindric surfaces of stepped diameter and which terminates at its lower end in a threaded shank upon which nut 204 is engaged. The description of one of the bearings applies equally to the other, the only difference in the construction being that the drive gear 199 has affixed to the upper end of the shaft a worm gear 210 engaged by worm pinion 211. A bearing shell 208 is secured against the under face of auxiliary deck 201 by means of bolts 209 spaced about the flange of the shell. An outer race 207 comprises a ring having opposed conic faces, and receives upper and lower inner races 206 and 205 and their associated sets of cone rollers. Race 206 is prevented from moving upwardly relative to shaft 203 by virtue of the enlarged diameter of the upper end of the latter, on which worm gear 210 is strongly keyed. Lower race 205 is assembled under axial pressure of gear 199, keyed on the lower end of the shaft but reciprocable therealong, depending on the setting of nut 204. Suitable locking means as a split washer is preferably interposed between the nut and the gear.

Figure 5:
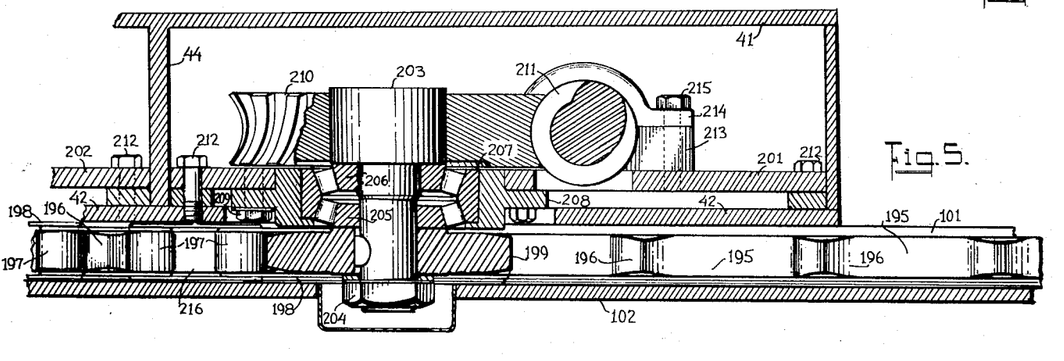
Fig. 5 is a section looking toward the front of the truck, on the line 5—5 of Fig. 1, and showing the steering mechanism.

In order to prevent interference between the gear 199 and the arc 195 the former is made with teeth spaced two pitch distances, and the engagement of the chain with both the arc and the gear is such that a gear tooth enters a gap between those adjacent chain rollers not straddling an arc tooth, as at 216. The number of teeth on gear 199 may be four, for example, or where a higher step-down ratio between worm gear 210 and gear 199 is desired three teeth may be found practical for the latter.

Worm 211 and mating gear 210 are conventional, and the shaft holding the former is suitably supported between a pair of bearings such as the block bearing 213 having shell 214, which is assembled and held to auxiliary deck 201 by a number of bolts 215. A steering wheel 217 and steering column 218 are provided, with universal joint coupling means 219 at the steering drive.

The description hereinbefore given relating to the front truck frame structure substantially also relates to the rear truck frame structure. In the latter, the frame comprises a transversely extending generally tubular frame member 46' having rearwardly extending tubular end frames 84' secured on its ends, and a hollow braced intermediate end frame member 86' parallel with the end frames also secured to the midlength position of box-like braced transverse frame 46'. A rear joining bar 95' is detachably secured to the after ends of each of the end and intermediate frames, as previously described. The transverse drive shaft 33 is wholly enclosed in hollow transverse member 46'.

While the use of three sectional drum wheels per axle is illustrated, the use of two wheels per section is regarded as an obvious alternative.

We claim:

1. A powered traction vehicle comprising a first truck having a first main frame and wheels revolubly supported on first axle means journalled in said first main frame, a second truck having a second main frame and wheels revolubly supported on second axle means journalled in said second main frame, and a chassis articulateably connected between said first and said second frames and spacing said trucks apart, including a first coupling connecting the chassis with said first main frame for relative rotation about a first pivot axis longitudinally of the vehicle and at right angles to the first axle means, and a second coupling connecting the chassis with said second main frame for relative rotation about a second pivot axis at right angles to and intersecting the first pivot axis and at right angles to and intersecting the second axle means, wherein said second truck comprises a rigid U-shaped second main frame including a tubular transverse frame member having integral downwardly-extending vertical tubular end frame members formed with an axle-bearing receiving aperture adjacent the lower end of each of said end frame members, and having integral horizontal parallel tubular side frame members extending forwardly and rearwardly from the aperture, said end frame members each having a vertical wall opposing and parallel to a like wall in the other end frame member formed as a plate, said transverse frame member being integrally joined with said plates, a pair of formed pan-like drive housings detachably secured upon opposed faces of said plates along the margins thereof, and a guide arc disposed in a horizontal plane and coaxial with said second pivot axis having its ends integrally joined with the ends of the rearward extensions of said horizontal side frame members.

2. A vehicle as in claim 1, wherein said second main frame includes bracing structure in the form of a buoyant tank comprising a cylindric shield having its axis coincident with the axes of the axle-bearing receiving apertures, said shield being integrally joined with said transverse frame member and said plates having rearward extensions joined with said shield, a horizontal deck integrally joined with said transverse frame member and extending rearwardly, and a formed body having a surface of revolution coaxial about the vertical pivot axis integrally joined with both said shield and said deck, and a bottom closing horizontal plate extending parallel with said deck and being integrally joined with the lower ends of said shield and of said formed body.

3. A vehicle as in claim 2, wherein there is provided an additional vertical frame member intermediate the tubular end frame members comprising a tublar vertical strut having an axle-bearing receiving aperture adjacent the lower end and having horizontal tubular frame members extending forwardly and rewardly from the aperture and a vertical plate integrally joined with said additional member and said shield and disposed in the longitudinal plane of the vehicle.

4. A vehicle as in claim 1, wherein the second truck includes a tubular transverse horizontal frame member detachably attached to the ends of said forwardly extending horizontal tubular frame members.

5. A powered traction vehicle as in claim 1 wherein the said first truck main frame comprises a U-shaped tubular frame having a transverse structural element and wherein the first coupling means journalling the first main frame for rotation relatively to the chassis about a common longitudinal axis comprises a cylindrically walled recess formed in the element coaxial with said axis, a cylindric boss of lesser radius seated coaxially in the recess and joined integrally with a vertical wall of the element at the base of the recess, a first coaxial thrust bearing disposed between the recess wall and the outside of the boss, an open-ended tube integral with the chassis having a first bearing seat formed in the free end extending therefrom coaxially within the coupling to engage said thrust bearing, and second thrust bearing means detachably secured to the end of said boss remote from said recess vertical wall and supported within a second bearing seat formed within the base of the tube remote from said first bearing seat for retaining said boss and said tube in assembled relation for relative rotation about said axis.

6. A powered traction vehicle comprising a first truck having a first main frame and wheels revolubly supported on first axle means journalled in said first main frame, a second truck having a second main frame and wheels revolubly supported on second axle means journalled in said second main frame, and a chassis articulateably connected between said first and said second frames and spacing said trucks apart, including a first coupling connecting the chassis with said first main frame for relative rotation about a first pivot axis longitudinally of the vehicle and at right angles to the first axle means, and a second coupling connecting the chassis with said second main frame for relative rotation about a second pivot axis at right angles to and intersecting the first pivot axis and at right angles to the second axle means, said couplings being spaced apart in the direction of the first pivot axis, wherein said first main frame comprises a rigid tubular transverse frame member having integral rearwardly extending parallel braced tubular end frame members forming a U-shaped structure, each end frame member being formed with an axle-bearing receiving aperture intermediate its length and spaced from said transverse frame member and being integral with a plate forming a wall thereof opposed to and parallel with a like wall of the other end frame member and extending beyond said end frame members, and wherein said first main frame further comprises a pair of drive housings detachably secured to the margins of said plates and with said transverse frame member.

7. A vehicle as in claim 6, wherein said first main frame further includes a tubular frame member parallel with and spaced intermediately of said end frame members and integrally joined with said transverse frame member and having an axle-bearing receiving aperture aligned with the apertures in said end frame members.

8. A vehicle as in claim 7, wherein the first truck includes a tubular transverse horizontal brace member detachably attached to the ends of said rearwardly extending parallel tubular end frame members and the end of said intermediate tubular frame member.

9. A vehicle as in claim 6, wherein the tubular transverse frame member comprises parallel vertical side walls and parallel upper and lower walls and has the vertical wall on the side opposite said end frame members apertured intermediate its ends and encloses a cylindric shell registered within the aperture coaxial with said first pivot axis and joined by an end thereof with the said vertical side wall, said shell having an axial extent substantially equal to the width of said transverse frame member in the direction of said first axis and having a radially inturned flange joined with the free end, the diameter of said shell being less than that of the aperture and less than the spacing between said upper and lower walls.

References Cited in the file of this patent

UNITED STATES PATENTS

| | | |
|---|---|---|
| 1,090,132 | Buchanan | Mar. 17, 1914 |
| 1,202,472 | Binford | Oct. 24, 1916 |
| 1,294,791 | Grady | Feb. 18, 1919 |
| 1,393,779 | Heinze | Oct. 18, 1921 |
| 1,416,329 | Blodgett | May 16, 1922 |
| 1,602,630 | White | Oct. 12, 1926 |
| 2,107,384 | McQueen | Feb. 8, 1938 |
| 2,503,111 | Higgins | Apr. 4, 1950 |

FOREIGN PATENTS

| | | |
|---|---|---|
| 812,676 | Germany | Sept. 3, 1951 |
| 423,542 | Great Britain | Feb. 4, 1935 |